3,379,718
PROCESS FOR PREPARING COBALAMINE-SULPHONIC ACID
Otto Wagner, Wuppertal-Elberfeld, Germany, assignor to Farbenfabriken Bayer Aktiengesellschaft, Leverkusen, Germany, a corporation of Germany
No Drawing. Filed Oct. 5, 1966, Ser. No. 584,340
Claims priority, application Germany, Oct. 27, 1965, F 47,523
9 Claims. (Cl. 260—211.5)

The present invention relates to the preparation of cobalamine-sulphonic acid in substantially quantitative yield by the reaction of an alkene-, or alkyl-sulphite with a non-coenzyme-like cobalamine in basic solution.

It is known that the action of sulphurous acid or its salts on cyano-cobalamine or hydroxy-cobalamine leads to the formation of a substance which was isolated and described for the first time in 1961 [K. Bernhauer, O. Müller and O. Wagner, 2nd European Symposium on Vitamin $B_{12}$ and Intrinsic Factor, Hamburg 1961, page 110, Stuttgart Enke 1962], and the structure of which could be explained two years later [K. Bernhauer and O. Wagner, Biochem. Z. 337, 336 (1963)]. This compound is cobalamine-sulphonic acid.

The previously known methods of producing this compound gave maximum yields of about 60% of cobalamine-sulphonic acid, besides various other unidentified cobalamine compounds. This necessitated cumbersome and time-consuming methods of purification which had to be carried out in the dark or in subdued red light because of the sensitivity of the substance to light and actinic rays.

The complexity of this process of production has hitherto prevented the manufacture of cobalamine-sulphonic acid on a large scale. On the other hand, this compound appeared to be of considerable pharmaceutical interest, since experiments in vitro had shown that it can be converted with particular ease enzymatically into the native vitamin $B_{12}$ coenzyme. Moreover, its physico-chemical properties agree well with those of the coenzyme.

For these reasons it seemed desirable to find a useful process of production.

It has now been found that a virtually quantitative yield of cobalamine-sulphonic acid is obtained by adding an alkene- or alkyl-sulphite to an ammoniacal or basic solution of a non-coenzyme-like cabalamine. This rendered unnecessary all operations of purification previously used. The use of volatile bases has the additional advantage that a salt-free solution results so that the otherwise indispensable phenol extraction is also saved.

The term "non-coenzyme-like cobalamines" as used herein includes all cobalamines except cobalamine-coenzyme and alkyl-cobalamines, for example, cyano-, hydroxy-, sulphato-, nitrito-, sulphito-, thiocyanato-cobalamines, etc., as well as water-soluble cobalamines formed by anions.

The process according to the invention is carried out in water or a polar solvent at a temperature between 25° C. and the boiling point of the solvent used, the reaction time lying between 15 minutes and 5 hours. Suitable bases are ammonia, amines, pyridines and their derivatives and also metal hydroxides.

Cobalamine-sulphonic acid is useful for pharmaceutical purposes.

The invention is illustrated by the following non-limitative examples.

Example 1

1 gram of cobalamine is mixed in 300 ml. of water with 320 mg. of ethylene-sulphite (40% in ethanol) and 50 ml. of a N/10 ammonia solution.

A slow current of nitrogen is then conducted through the solution which is kept in the dark at 50° C. for 5 hours. The solution is evaporated to dryness under reduced pressure, again in the dark, taken up with 300 ml. of water and shaken once with 100 ml. of chloroform. The cobalamine-sulphonic acid remaining in the aqueous phase is then concentrated to a volume of 30 to 40 ml. and caused to crystallize by the addition of acetone and subsequent standing at +4° C. The yield of cobalamine-sulphonic acid is virtually quantitative. Comparison of the ultra-violet and infra-red spectra and the chromatographic and electrophoretic properties of the substance so obtained proves its identity with authentic cobalamine-sulphonic acid.

Example 2

100 milligrams of cyano-cobalamine in 50 ml. of water are mixed with 32 mg. of ethylene-sulphite (40% ethanol) and 5 ml. of N/10 $NH_4OH$. A slow current of nitrogen is conducted through the solution which is kept under reflux in the dark at 50° C. for 5 hours. The solution is concentrated to dryness in a rotary thin-layer evaporator, again in the dark, taken up with 50 ml. of water and briefly shaken with 20 ml. of n-butanol. The cobalamine-sulphonic acid remaining in the aqueous phase is then concentrated to a volume of about 5 ml. and caused to crystallize by the addition of acetone and subsequent standing at +4° C. The yield is almost quantitative.

Example 3

1 gram of cobalamine is mixed in 300 ml. of water with 350 mg. of diethyl-sulphite (40% in ethanol) and 50 ml. of a N/10 ammonia solution. Working up is carried out as in Example 1.

Example 4

100 milligrams of cobalamine in 200 ml. ethanol (about of 93%) are mixed with 45 mg. of ethylene-sulphite and 0.5 ml. of monoethanol amine. A slow current of nitrogen is conducted through the solution which is kept in the dark at the boiling point of the solvent for 15 minutes. Working up is carried out as in Example 1.

Example 5

100 milligrams of cobalamine in 200 ml. of ethanol (about of 39%) are mixed up with 50 mg. of diethyl-sulphite (40% ethanol) and 0.7 ml. of monoethanol. Working up is carried out as in Example 4.

Example 6

1 gram of cobalamine in 250 ml. of dimethylformamide is mixed with 350 ml. ethylene-sulphite (40% in ethanol) and 3 ml. of pyridine. A slow current of nitrogen is conducted through the solution which is kept in the dark at 50° C. for 1 hour. Working up is carried out as in Example 1.

Example 7

1 gram of cobalamine in 350 ml. of water is mixed with 350 mg. ethylene-sulphite (40% in ethanol) and 5 ml. of a N/10 KOH solution. A slow current of nitrogen is conducted through the solution which is kept in the dark at 65° C. for 4 hours. A phenol extraction follows in known manner. The aqueous solution of cobalamine-sulphonic acid is then concentrated to a volume of 5 ml. and caused to crystallize by the addition of acetone and subsequent standing at 4° C.

What is claimed is:
1. A process for preparing cobalamine-sulphonic acid which comprises adding an alkene-sulphite or alkyl sulphite to an ammoniacal or basic solution of a non-coenzyme-like cobalamine and recovering the cobalamine-sulphonic acid thus formed.
2. A process according to claim 1, in which the prepa- ration of the cobalamine-sulphonic acid is carried out in water or a polar solvent at a temperature between 25° C. and the boiling point of the solvent employed.

3. A process according to claim 1, in which the reaction time for the formation of the cobalamine-sulphonic acid is ¼ to 5 hours.

4. A process according to claim 1, in which the sulphite is ethylene sulphite.

5. A process according to claim 1, in which the sulphite is diethyl sulphite.

6. A process according to claim 1, in which the non-coenzyme-like cobalamine is any cobalamine other than cobalamine-coenzyme or an alkyl-cobalamine.

7. A process according to claim 1, in which the base is ammonia, an amine, a pyridine or a metal hydroxide.

8. A process according to claim 1, in which the reaction is carried out in the absence of actinic light rays.

9. A process according to claim 1, in which the non-coenzyme-like cobalamine is cobalamine or cyano-cobalamine.

References Cited

UNITED STATES PATENTS 3,033,849   5/1962   Sifferd.
3,167,539   1/1965   Smith.

LEWIS GOTTS, *Primary Examiner.*

J. R. BROWN, *Assistant Examiner.*